(12) United States Patent
Lee et al.

(10) Patent No.: US 6,346,775 B1
(45) Date of Patent: Feb. 12, 2002

(54) SECONDARY ELECTRON AMPLIFICATION STRUCTURE EMPLOYING CARBON NANOTUBE, AND PLASMA DISPLAY PANEL AND BACK LIGHT USING THE SAME

(75) Inventors: Won-tae Lee; Wong-bong Choi; In-taek Han; Jeong-hee Lee; Se-gi Yu, all of Yongin (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 09/562,891

(22) Filed: May 1, 2000

(30) Foreign Application Priority Data

Feb. 7, 2000 (KR) .............................................. 00-5648

(51) Int. Cl.[7] .................................................. H01J 1/30
(52) U.S. Cl. ..................... 315/169.3; 313/309; 313/311; 313/495
(58) Field of Search ........................ 315/169.1–169.4; 313/309–311, 336, 351, 495

(56) References Cited

U.S. PATENT DOCUMENTS

| 5,760,536 A | * | 6/1998 | Susukida et al. | ............ 313/311 |
| 6,097,138 A | * | 8/2000 | Nakamoto | ................... 313/309 |
| 6,130,503 A | * | 10/2000 | Negishi et al. | ............. 313/495 |
| 6,250,984 B1 | * | 6/2001 | Jin et al. | ...................... 445/51 |

* cited by examiner

*Primary Examiner*—Don Wong
*Assistant Examiner*—Wilson Lee
(74) *Attorney, Agent, or Firm*—Burns, Doane, Swecker & Mathis, L.L.P.

(57) ABSTRACT

A secondary electron amplification structure employing carbon nanotube and a plasma display panel and back light using the same are provided. The secondary electron amplification structure is formed by stacking a MgO film, a film of a fluoride such as $MgF_2$, $CaF_2$ or LiF, or a film of an oxide such as $Al_2O_3$, ZnO, CaO, SrO, $SiO_2$ or $La_2O_3$ on a carbon nanotube (CNT), which functions to increase the secondary electron emission coefficient caused by electrons or ions.

23 Claims, 8 Drawing Sheets

SECONDARY ELECTRON AMPLIFICATION STRUCTURE EMPLOYING CARBON NANOTUBE, AND PLASMA DISPLAY PANEL AND BACK LIGHT USING THE SAME

The following is based on Korean Patent Application No. 00-5648 filed Feb. 7, 2000, herein incorporated by reference.

BACKGROUND OF THE INVENTION

1. Field of the Invention

The present invention relates to a secondary electron amplification structure employing carbon nanotube and a plasma display panel and back light using the same.

2. Description of the Related Art

Display devices can be largely classified into either Braun tubes or flat panel display devices. A flat panel display device is thin and convenient to carry compared to a Braun tube. Moreover, a flat panel display device consumes less power than a Braun tube. For this reason, a new market for a flat panel display devices compensating for these drawbacks of Braun tubes has been made.

Representative flat panel display devices are liquid crystal displays (LCDs), plasma display panels (PDPs) and field emission displays (FED). PDPs are favorable for large screen displays so that they can compensate for the drawbacks of LCDs. Photomultipliers such as photomultiplier tubes (PMTs) and microchannel plates (MCPs) compensate for the drawbacks of these display devices by improving luminance.

FIG. 1 is a perspective view of a conventional surface discharge type triode plasma display panel (PDP) widely used at present. FIGS. 2A and 2B are vertical sectional views of the surface discharge type triode PDP taken widthwise and lengthwise. As shown in the drawings, a surface discharge type triode PDP includes a front glass substrate 20 and a rear glass substrate 10 which face each other with a predetermined gap therebetween. Partition walls 13 are formed between the gap to partition the space and construct cells having discharge spaces 21 corresponding to pixels. Each of the discharge cells for provoking discharge includes an address electrode 11, a scanning electrode 14 and a common electrode 15. The scanning electrode 14 and the common electrode 15 are disposed on the same plane and in a plane parallel to and axially orthogonal to the address electrode 11, thereby provoking surface discharge and displaying an image when the electrodes are appropriately charged. Reference numeral 12 indicates a dielectric layer, reference numeral 17 indicates a luminescent material, reference numeral 16 indicates a bus electrode, reference numeral 18 indicates a dielectric layer and reference numeral 19 indicates a MgO protection layer.

As described above, the PDP provided with plasma discharge spaces formed by partition walls mounted on a substrate displays an image by provoking discharge. The partition wall 13 is formed to have a uniform pattern using a printing method. The partition wall 13 allows a discharge in a cell to be discriminated from a discharge of an adjacent cell.

The MgO protection layer 19 enhances the efficiency of the discharge cell by emitting secondary electrons in the discharge cell to thereby decrease discharge voltage applied between electrodes. Consequently, the MgO protection layer 19 serves to protect the electrodes within the PDP.

Since materials conventionally used for PDPs, FEDs and photomultipliers have a low secondary electron emission coefficient, they have a low electron amplification factor. This increases voltage and weakens luminance. A PDP using discharge has discharge cells having discharge spaces for facilitating discharge. A MgO layer is formed in the space within each discharge cell as a protection layer. The MgO layer is usually made by forming a thin film using a sputtering method and an electron beam evaporation method. However, deposition of only single material, MgO, has a limitation in achieving a sufficient secondary electron emission effect within a plasma discharge space. In addition, it is desirable for the secondary electron emission to be enhanced in FEDs and photomultipliers such as PMTs and MCPs.

SUMMARY OF THE INVENTION

To solve the above problems, it is an object of the present invention to provide a secondary electron amplification structure for maximizing secondary electron emission using a carbon nanotube while maximally sustaining the advantage of a MgO layer emitting secondary electrons.

It is another object of the present invention to provide a plasma display panel and a liquid display panel back light, which employ the secondary electron amplification structure capable of lowering a driving voltage and improving luminance by maximizing secondary electron emission.

Accordingly, to achieve the above objects, the present invention provides a secondary electron amplification structure including a carbon nanotube layer, and a MgO layer stacked on the carbon nanotube.

It is preferable that, instead of the MgO layer, a layer formed of $MgF_2$, $CaF_2$, $LiF$, $Al_2O_3$, $ZnO$, $CaO$, $SrO$, $SiO_2$ or $La_2O_3$ is used, and the carbon nanotube layer is deposited on an electrode formed of at least one metal among Cs, W, Mo, Ta, Fe and Cu.

To achieve the above objects, the present invention also provides a plasma display panel including front and rear substrates disposed to face each other with a predetermined gap therebetween, electrodes formed between the facing front and rear substrates, the electrodes crossing one another in a striped pattern, partition walls formed between electrodes on the rear substrate parallel to the electrodes, the partition walls allowing the predetermined gap between the front and rear substrates to be sustained, the partition walls forming discharge cells, and luminance materials deposited on the sides of the partition walls and on the electrodes on the rear substrate. The plasma display panel employing a secondary electron amplification structure includes a carbon nanotube layer formed on the electrodes on the front substrate, and a MgO layer stacked on the carbon nanotube layer.

Instead of the MgO layer, a layer formed of $MgF_2$, $CaF_2$, $LiF$, $Al_2O_3$, $ZnO$, $CaO$, $SrO$, $SiO_2$ or $La_2O_3$ may be used. The electrodes may be formed of at least one metal among Cs, W, Mo, Ta, Fe and Cu. The plasma display panel also includes a carbon nanotube between each luminescent material and each electrode on the rear substrate and/or a carbon nanotube layer on each partition wall between each luminescent material and the MgO layer.

To achieve the above objects, the present invention also provides a surface discharge type triode plasma display panel including front and rear substrates disposed to face each other with a predetermined gap therebetween, address electrodes formed on the rear substrate in a striped pattern, partition walls formed between the address electrodes on the rear substrate parallel to the address electrodes, the partition walls allowing the predetermined gap between the front and rear substrates to be sustained, the partition walls forming discharge cells, luminance materials deposited on the sides of the partition walls and on the address electrodes, scanning electrodes and common electrodes formed parallel to each other on the front substrate with a predetermined gap therebetween, the scanning and common electrodes crossing the address electrodes in a striped pattern, and a dielectric layer deposited on the front substrate such that the scanning and common electrodes are covered with the dielectric layer. The plasma display panel employing a secondary electron amplification structure includes a carbon nanotube layer formed on the dielectric layer, and a MgO layer stacked on the carbon nanotube layer.

Instead of the MgO layer, a layer formed of $MgF_2$, $CaF_2$, LiF, $Al_2O_3$, ZnO, CaO, SrO, $SiO_2$ or $La_2O_3$ may be used. The electrodes may be formed of at least one metal among Cs, W, Mo, Ta, Fe and Cu. The surface discharge type triode plasma display panel also includes a carbon nanotube layer between each luminescent material and each electrode on the rear substrate and/ or a carbon nanotube layer on each partition wall between each luminescent material and the MgO layer.

To achieve the above objects, the present invention also provides a back light including front and rear substrates disposed to face each other with a predetermined gap therebetween to form a discharge space, a first electrode formed on the surface of the front substrate in the discharge space, a luminescent material layer formed on the first electrode, a second electrode and a third electrode formed parallel to each other on the rear substrate in the discharge space with a predetermined gap therebetween, the second and third electrodes sustaining discharge, a dielectric layer deposited on the rear substrate such that the second and third electrodes are covered with the dielectric layer, and partition walls for allowing the predetermined gap between the front and rear substrates to be sustained and sealing the discharge space tightly. The back light employing a secondary electron amplification structure includes a carbon nanotube formed on the dielectric layer, and a MgO layer stacked on the carbon nanotube layer.

Instead of the MgO layer, a layer formed of $MgF_2$, $CaF_2$, LiF, $Al_2O_3$, ZnO, CaO, SrO, $SiO_2$ or $La_2O_3$ may be used. The second and third electrodes may be formed of at least one metal among Cs, W, Mo, Ta, Fe and Cu. The back light also includes a carbon nanotube layer between the luminescent material layer and the first electrode.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

The present invention provides a secondary electron amplification structure in which a carbon nanotube (CNT) is first formed and an MgO layer is stacked on the CNT, thereby maximizing the discharge efficiency of a discharge cell while sustaining the advantage of a conventionally used MgO layer. The present invention inserts the secondary electron amplification structure into a protection layer, a luminescent material and a partition wall to provide a plasma display panel (PDP) and a back light for a liquid display panel, in which electron emission is maximized.

Figure 1:
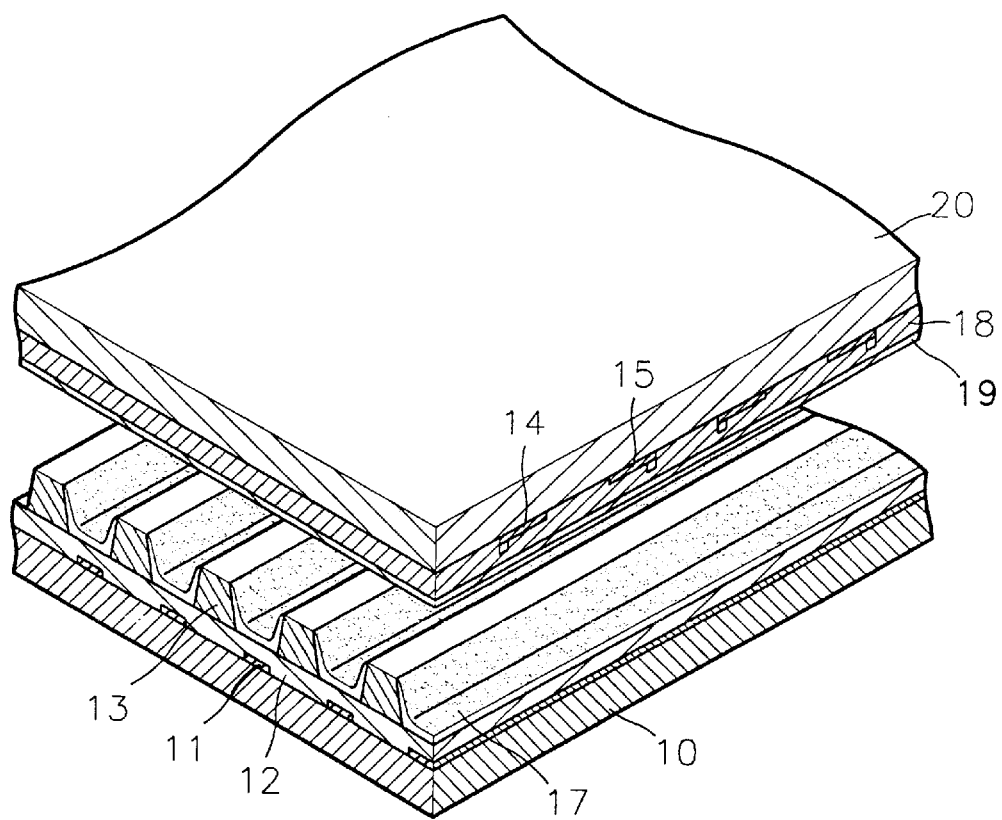
FIG. 1 is a perspective view of a conventional surface discharge type triode plasma display panel (PDP)
Figure 2A:
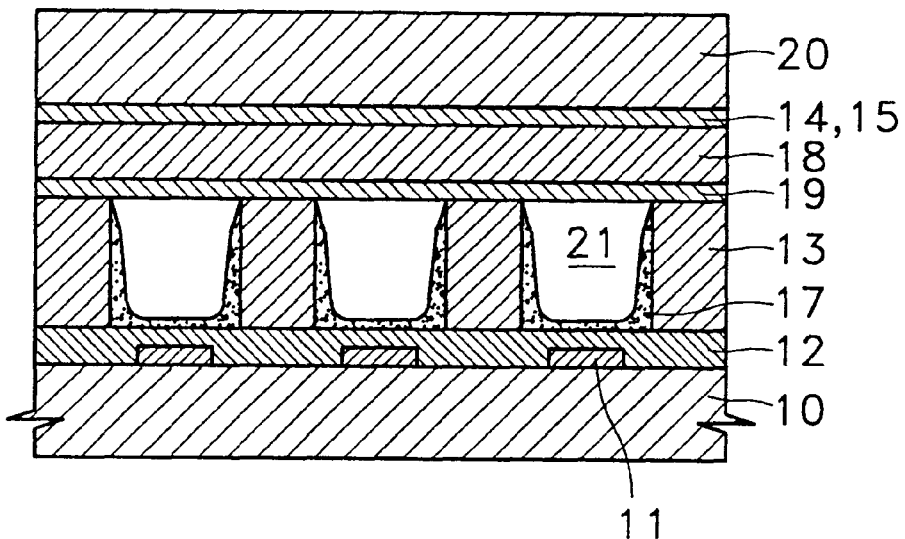
FIGS. 2A and 2B are vertical sectional views of the surface discharge type triode PDP taken widthwise and lengthwise.
Figure 2B:
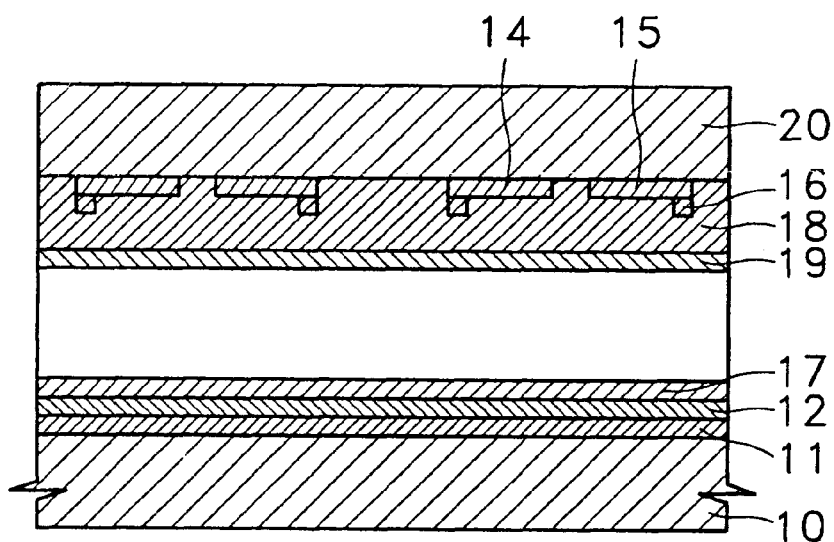
Figure 3:
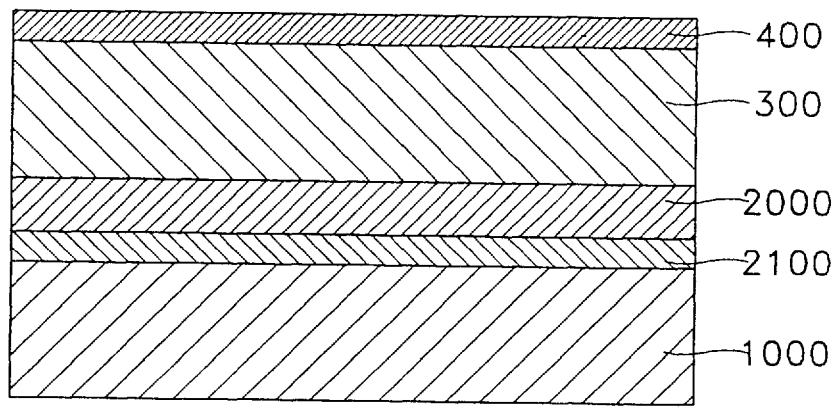
FIG. 3 is a sectional view of an embodiment of a secondary electron amplification structure according to the present invention.

Referring to FIG. 3, a secondary electron amplification structure according to the present invention is composed of a CNT 300 and a MgO layer 400. In FIG. 3, the secondary electron amplification structure is stacked on an electrode 200 on a glass substrate for measuring the secondary electron emission efficiency of the secondary electron amplification structure. A Ni layer is used for the electrode 2000. Ni layers do not deposit well on glass substrates, so a Cr layer 2100 is deposited on the glass substrate 1000 as a buffer layer before depositing the Ni layer 2000. Instead of the MgO layer 400, a fluoride such as $MgF_2$, $CaF_2$ or LiF or an oxide such as $Al_2O_3$, ZnO, CaO, SrO, $SiO_2$ or $La_2O_3$ may be formed on the CNT 300 to form a secondary electron amplification structure. In this case, a sufficient secondary electron amplification effect can also be obtained. These materials are preferably formed on the electrode 2000 which is composed of a metal having a large electron emission coefficient, such as Cs, W, Mo, Ta, Fe or Cu.

The secondary electron amplification structure in which a MgO layer is deposited on a CNT was tested for secondary electron emission. In the test, a secondary electron emission coefficient δ was measured with respect to three samples of a MgO layer, a CNT and a CNT+MgO layer of the present invention using the apparatus of FIG. 4.

Figure 4:
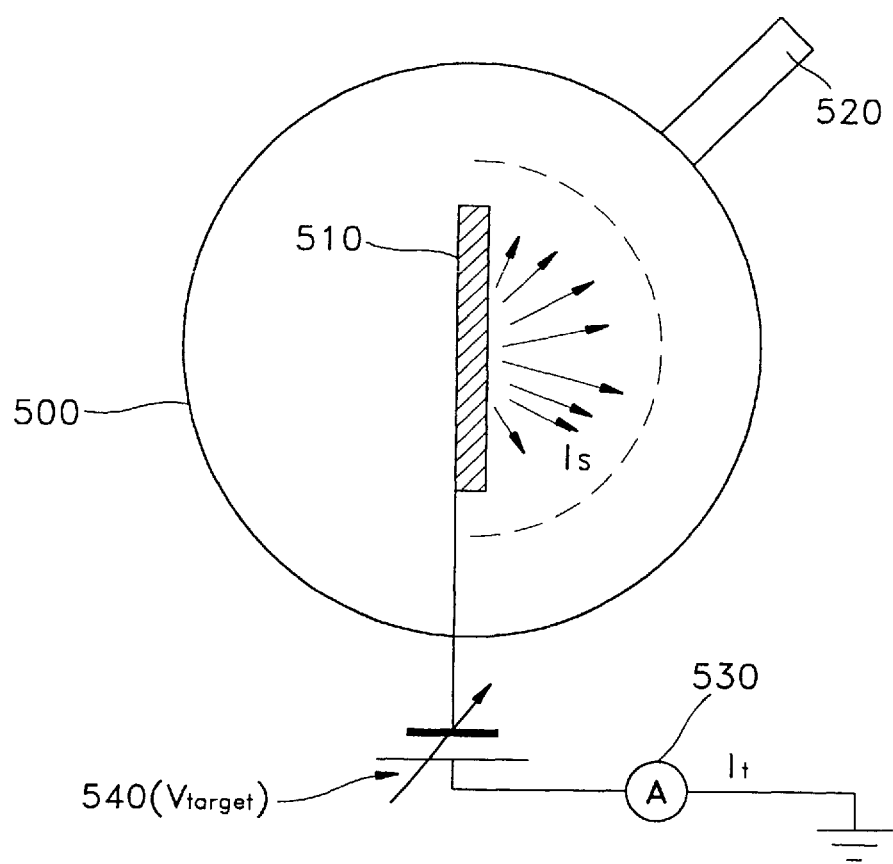
FIG. 4 is a schematic diagram of an apparatus for measuring a secondary electron emission coefficient.

Referring to FIG. 4, the apparatus for measuring a secondary electron emission coefficient includes a vacuum chamber 500, an electron gun 520 for shooting an electron beam at a sample 510, a variable power supply 540 for applying a voltage to the sample 510 and an ampere meter 530 for measuring current flowing through the sample 510.

In measuring a secondary electron emission coefficient, the sample 510 is put in the vacuum chamber 500. An electron beam is shot at the sample 510 by the electron gun 520 while the variable power supply 540 applies a voltage to the sample 510. Then, the electron beam collides with the surface of the sample 510, and thus secondary electrons are emitted. These secondary electrons create a current Is. The electron beam creates a current Ip. If it is assumed that a current measured by the ampere meter 530 is It, currents and a secondary electron emission coefficient have the relationship shown in Equation (1).

$$\delta = 1 - (It/Ip) = Is/Ip, \quad Ip = It + Is \tag{1}$$

In the case of the sample of a secondary electron amplification structure of the present invention, conditions of depositing a MgO layer on a CNT, such as the temperature of a substrate, a deposition rate, an oxygen tension and thickness, were varied during measurement. It was found that a secondary electron emission coefficient varies according to a factor. Conditions allowing a large secondary electron emission coefficient were found while varying factors. The sample of the present invention was compared with the other two samples under the best conditions.

Figure 5:
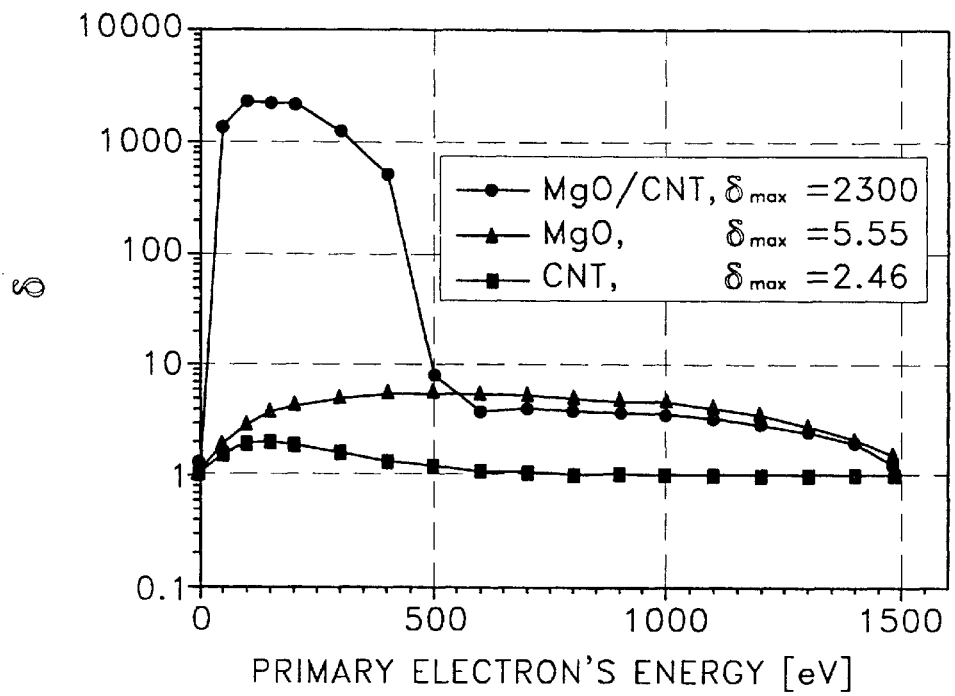
FIG. 5 is a graph showing the secondary electron emission coefficients varying according to electrons in samples of the secondary electron amplification structure of FIG. 3 which is formed of carbon nanotube (CNT)+MgO.

FIG. 5 is a graph showing a secondary electron emission coefficient varying according to a different primary electron's energy. As shown in FIG. 5, when secondary electron emission is maximum, the secondary electron emission coefficient of the sample of a CNT+MgO (or MgO/CNT) was 2300, the secondary electron emission coefficient of the sample of a MgO layer was 5.55, and the secondary electron emission coefficient of the sample of a CNT was 2.46. Consequently, it was seen that the MgO/CNT is a material having the largest secondary electron emission coefficient. As seen from the above, the secondary electron amplification structure has a relatively considerable secondary electron emission coefficient. Accordingly, it was proved that a considerable secondary electron amplification effect can be obtained when using the secondary electron amplification structure of the present invention in display devices, PDPs, field emission displays (FEDs), electron multipliers and electron multipliers.

Figure 6:
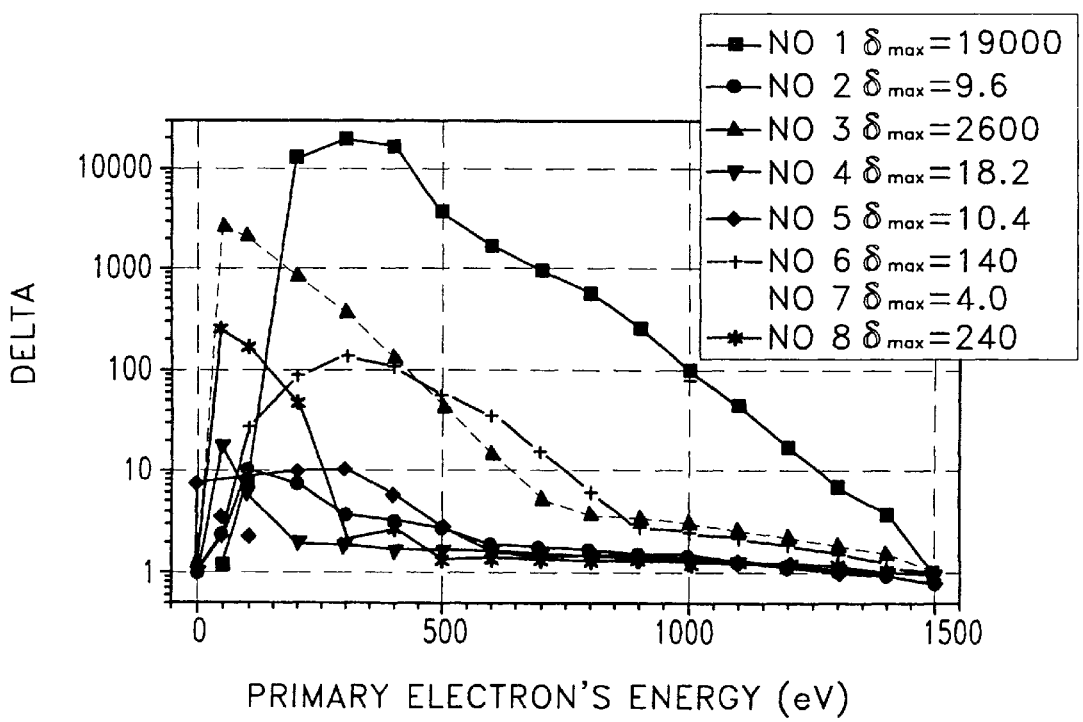
FIG. 6 is a graph showing a secondary electron emission coefficient varying according to the thickness of a deposited MgO layer in a secondary electron amplification structure according to the present invention.

FIG. 6 is a graph for comparing secondary electron emission coefficients δ having different values at different primary electron's energy in a sample of a secondary electron amplification structure according to the present invention. More specifically, the graph shows changes in secondary electron emission coefficient δ when the condition of a MgO layer is varied in a MgO/CNT structure. As shown in FIGS. 5 and 6, instead of increasing the amplification factor by many collisions in a conventional technology, a desired electron amplification factor can be obtained by only several amplifications in the present invention. A signal gain (i.e., an amplification factor) obtained in a secondary electron amplification structure of the present invention is expressed as $$\text{Gain} = \delta_1 \delta^{(n-1)} \tag{2}$$

where $\delta_1$ is an gain at an initial collision, $\delta^{(n-1)}$ is an average gain when collisions occur at a sample which has had an amplification factor at an initial collision, and n is the number of collisions of an electron when the electron moves along a channel.

As seen from Equation (2), a desired amplification factor can be easily obtained in the present invention by only several amplifications instead of many amplifications as in the conventional structure, thereby simplifying the structure of a photomultiplier tube (PMT) or a microchannel plate (MCP) and easily increasing the area of a PMT or a MCP. Conventionally, an increase in the amplification factor for a large screen results in high costs and makes the manufacturing difficult. When using a material according to the present invention, manufacturing becomes easy and manufacturing costs decrease.

In a second test, a second electron emission coefficient γ caused by ions is measured with respect to a secondary electron amplification structure fabricated in the same manner as in the first test, a CNT formed by a printing method and a conventional MgO layer together. The data obtained from the test proves that the secondary electron amplification structure of the present invention has a large secondary electron emission coefficient γ, thereby decreasing the driving voltage when it is used in a PDP and a back light employing the structure of PDP substituting for a MgO layer conventionally used as a protection layer. As a result of measuring secondary electron emission coefficients γ caused by ions, it was found that a secondary electron emission coefficient γ caused by ions increases in an actual PDP at an ion's acceleration voltage (less than 50 V). This is expressed as $$Vf = \frac{A(pd)}{\ln\left(\frac{B(pd)}{\ln\left(1 + \frac{1}{\gamma}\right)}\right)} \tag{3}$$

where Vf is the initial discharge voltage of a PDP, γ is a secondary electron emission coefficient, A and B are constants determined from gases, and d is the distance between electrodes. Since the secondary electron emission coefficient γ caused by ions increases based on Equation (3), a decrease in driving voltage can be anticipated.

Figure 7:
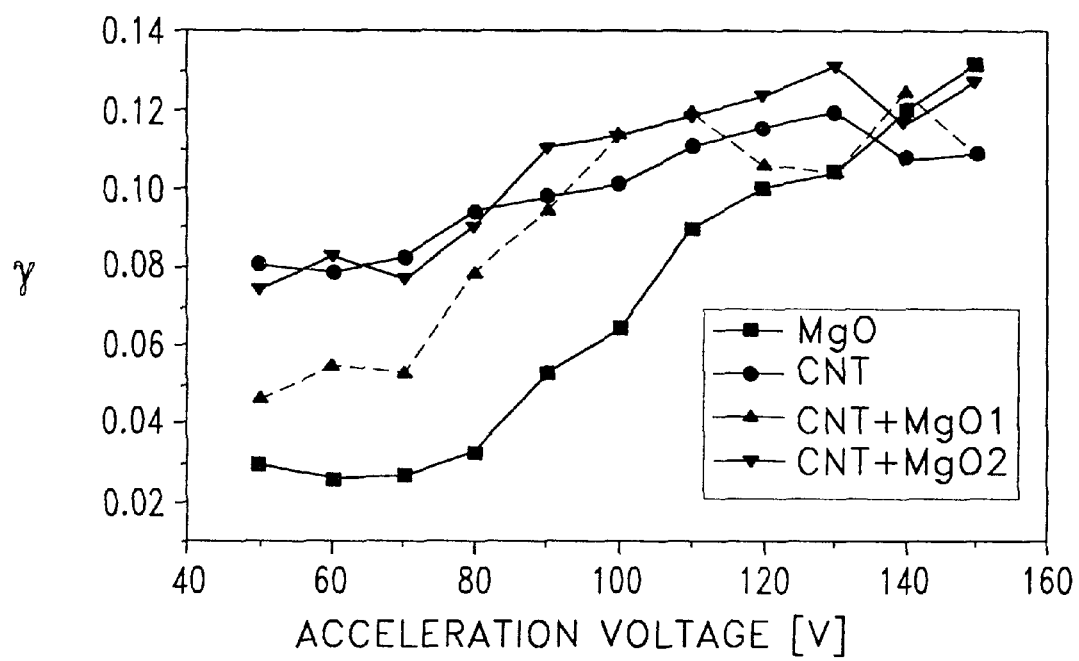
FIG. 7 is a graph showing the secondary electron emission coefficients varying according to ions in samples of the secondary electron amplification structure of FIG. 3 which is formed of carbon nanotube (CNT)+MgO.

FIG. 7 is a graph showing the results of the above measurement. From the graph, secondary electron emission coefficients γ caused by ions according to condition can be compared by comparing secondary electron emission coefficients of different material layers. In the graph of FIG. 7, MgO indicates a MgO layer, CNT indicates a carbon nanotube layer, CNT+MgO1 and CNT+MgO2 indicate structures in which a MgO layer is formed on a CNT under different deposition conditions. Since an acceleration voltage actually measured within the cell of a PDP is less than about 30 V, values of γ were compared in the range less than 30 V. As a result of the comparison, it was observed that the CNT and the CNT+MgO have a relatively large value of γ compared to the conventional MgO. This large value of γ represents a decrease in the driving voltage in a PDP or a back light lamp employing a PDP structure.

The test was performed for the first time and proves that a secondary electron emission coefficient increases when a MgO layer is formed on a CNT. The first test proved that a secondary electron amplification structure of the present invention increases a secondary electron emission coefficient δ caused by electrons, and the second test proved that a secondary electron amplification structure of the present invention increases the secondary electron emission coefficient γ caused by ions.

More specifically, while the secondary electron emission coefficient δ caused by electrons is 2–5 in a conventional MgO, the secondary electron emission coefficient δ caused by electrons increases up to 19000 in a secondary electron amplification structure of the present invention. This confirms that the secondary electron amplification structure increases the secondary electron emission caused by electrons by several hundred times compared to a known material (it is known that the secondary electron emission coefficient of the known material is about 80). The increase of the emission coefficient δ may be due to an increase in surface area of a MgO layer, but the exact reason is not known. Although it just can be said that the surface area of a MgO layer is increased, it is considered that the increase in emission coefficient δ is due to an amplification effect within a CNT material.

As a result of measuring secondary electron emission coefficients γ caused by ions, it was found that a secondary electron emission coefficient γ caused by ions increases in an actual PDP at an ion's acceleration voltage (less than 50 V). This is represented by Equation (3). As shown in Equation (3), the initial discharge voltage Vf decreases as the secondary electron emission coefficient γ caused by ions increases. It was confirmed in the test that a structure in which a MgO layer is formed on a CNT has a larger value of γ than a conventional MgO protection layer in a PDP discharge space (it is known that an ion's acceleration voltage is less than 50 V during discharge in a PDP), thereby dropping the driving voltage of the PDP. The structure increasing the value of γ may be used in a plate lamp employing the PDP structure for an LCD back light to drop the driving voltage of the lamp and thus decreasing the driving voltage of the LCD device.

Figure 8:
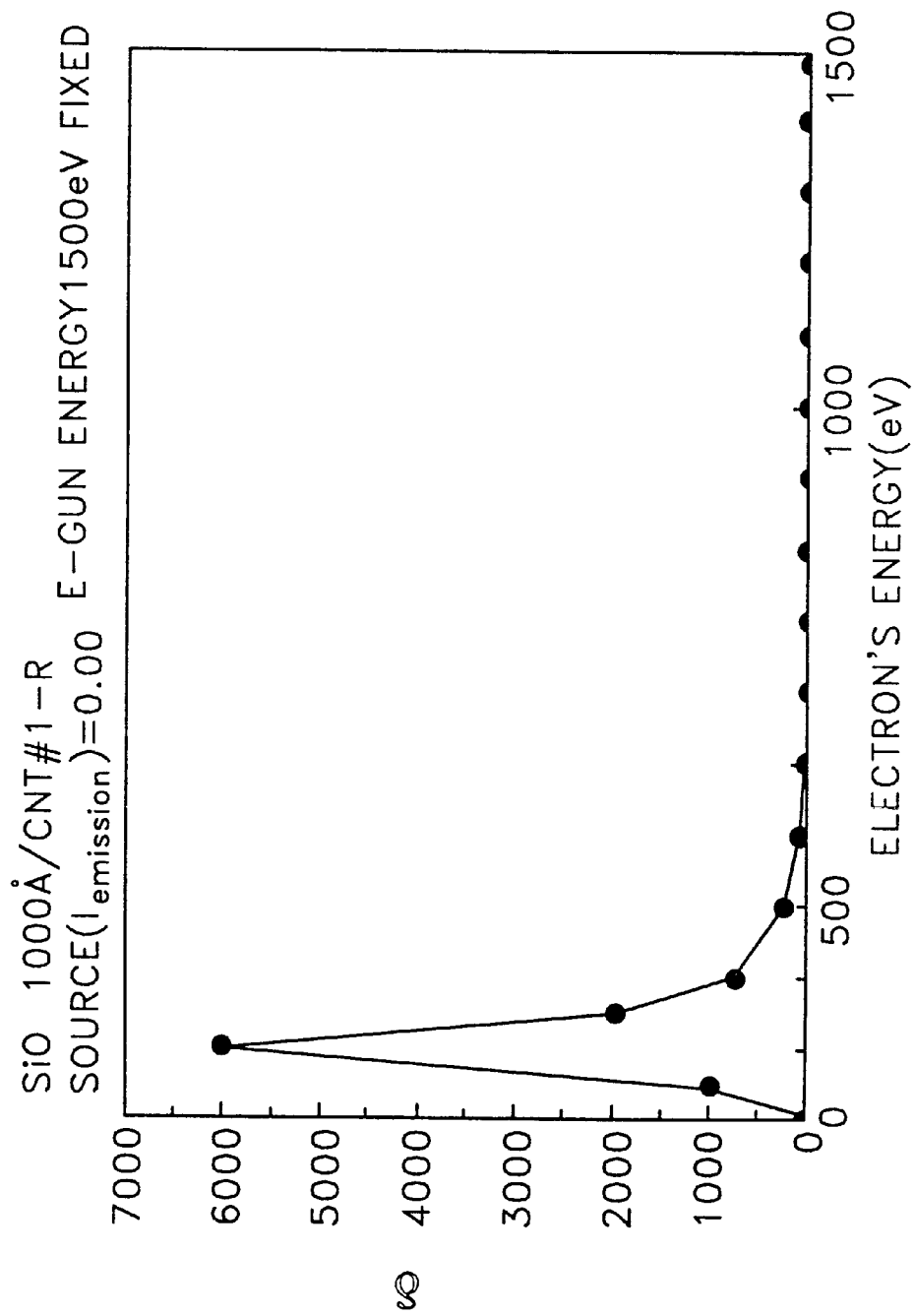
FIG. 8 is a graph showing the secondary electron emission coefficients varying according to electrons in samples of the secondary electron amplification structure of FIG. 3 which is formed of carbon nanotube (CNT)+$SiO_2$.

It has already been described that instead of a MgO layer, a fluoride such as $MgF_2$, $CaF_2$ or LiF or an oxide such as $Al_2O_3$, ZnO, CaO, SrO, $SiO_2$ or $La_2O_3$ may be stacked on a CNT when forming a secondary electron amplification structure of the present invention to obtain a sufficient secondary electron amplification effect. FIG. 8 shows the results of measuring the secondary electron amplification effect of a secondary electron amplification structure in which a $SiO_2$ layer is stacked on a CNT. As shown in FIG. 8, a secondary electron emission coefficient δ of the sample of a secondary electron amplification structure in which a $SiO_2$ layer is stacked on a CNT was increased up to 6000.

Figure 9:
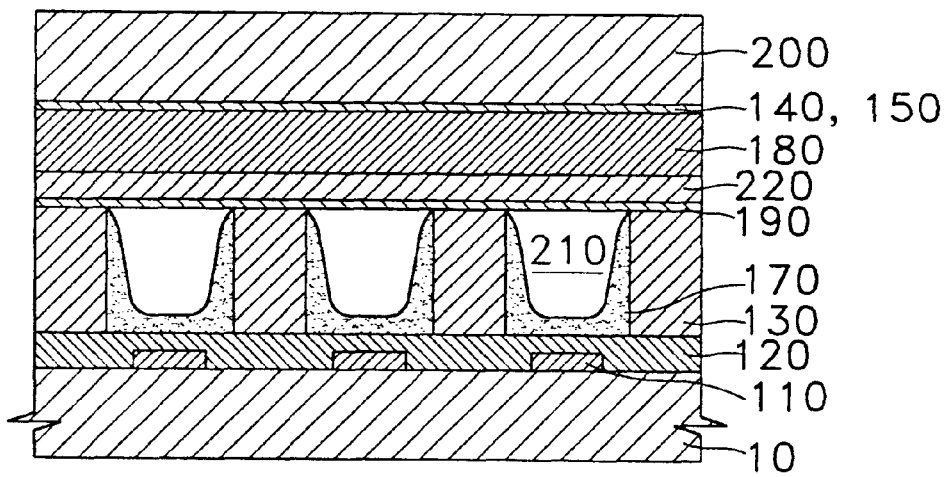
FIG. 9 is a vertical sectional view showing the schematic configuration of a plasma display panel employing a secondary electron amplification structure according to an embodiment of the present invention.

Based on these results, a secondary electron amplification structure of the present invention can be applied to display devices such as FEDs and PDPs in which a secondary electron emission coefficient caused by electrons and a secondary electron emission coefficient caused by ions greatly influence performance. The present invention can also be applied to MCPs and PMTs. Accordingly, the present invention allows manufacture of display devices and amplifiers, which have improved driving voltage. FIG. 9 shows an embodiment in which a secondary electron amplification structure is applied to a PDP according to the present invention.

Referring to FIG. 9, a surface discharge type triode PDP employing a secondary electron amplification structure includes a front glass substrate 200 and a rear glass substrate 10 which face each other with a predetermined gap therebetween. Partition walls 130 are formed between the gap to partition the space and construct cells having discharge spaces 210 corresponding to pixels. Each of the discharge cells for provoking discharge includes an address electrode 110, a scanning electrode 140 and a common electrode 150. The essential feature of the PDP according to the present invention is that a CNT 220 is disposed between a dielectric layer 180 and a MgO protection layer 190. In other words, the PDP includes a secondary electron amplification structure having the MgO protection layer 190 and the CNT 220. A fluoride such as $MgF_2$, $CaF_2$ or LiF or an oxide such as $Al_2O_3$, ZnO, CaO, SrO, $SiO_2$ or $La_2O_3$ may be used for the protection layer 190. In this case, the protection layer 190 coordinates with the CNT 220 in forming a secondary electron amplification structure, thereby obtaining a considerable secondary electron amplification effect. This secondary electron amplification structure is preferably formed on an electrode formed of a metal such as Cs, W, Mo, Ta, Fe or Cu having a large electron emission coefficient.

The scanning electrode 140 and the common electrode 150 are disposed on the same plane in parallel crossing the address electrode 110. When a voltage applied between the scanning electrode 140 and the common electrode 150 provokes surface discharge in a discharge space, secondary electrons are emitted in bulk. This means that mass plasma discharge by fluoride gas is provoked by the voltage applied between the scanning electrode 140 and the common electrode 150. Compared to a conventional PDP, a larger quantity of fluoride gas is ionized, thereby emitting a larger quantity of ultraviolet rays exciting a luminescent material 170. Consequently, the luminance of an image can be considerably increased. Reference numeral 120 is a dielectric layer.

Figure 10:
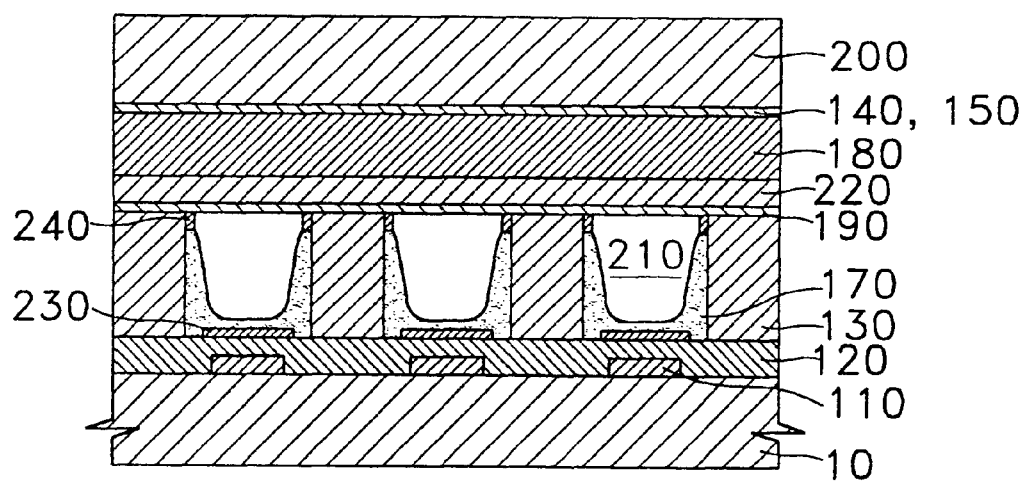
FIG. 10 is a vertical sectional view showing the schematic configuration of a plasma display panel employing a secondary electron amplification structure according to another embodiment of the present invention.

FIG. 10 is a sectional view of a PDP employing a secondary electron amplification structure according to another embodiment of the present invention. The structure of the PDP of FIG. 10 is similar to that of the PDP of FIG. 9. In the PDP of FIG. 10, a CNT 240 is deposited on the partition wall 130 and between a luminescent material 170 and a MgO protection layer 190 or a CNT 230 formed between the luminescent material 170 and an electrode 110 (or a dielectric layer 120).

Figure 11:
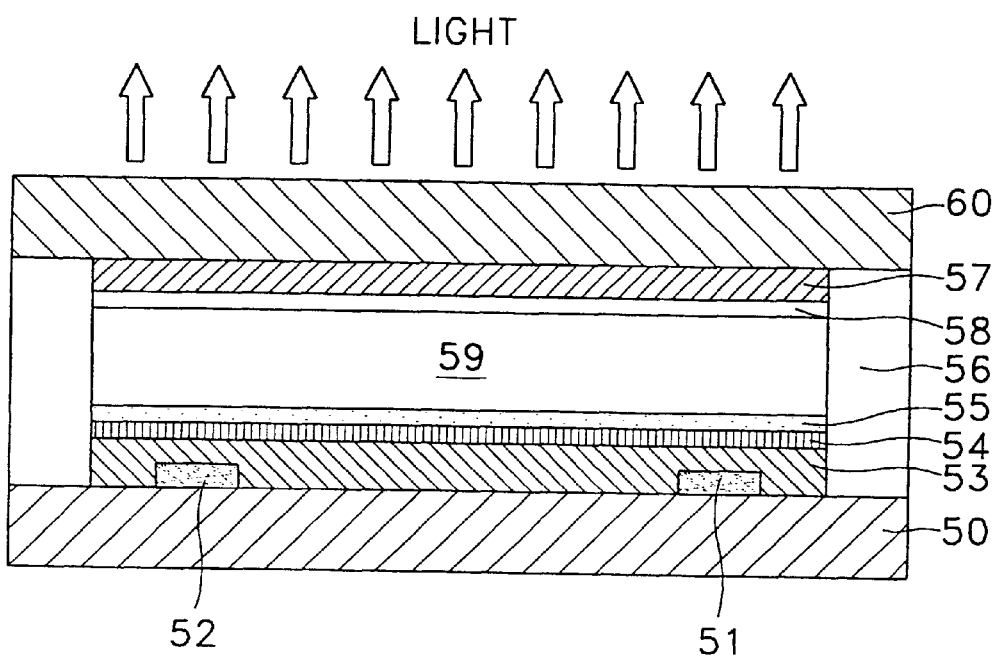
FIG. 11 is a vertical sectional view showing the schematic configuration of a liquid crystal display (LCD) back light employing a secondary electron amplification structure according to an embodiment of the present invention.

FIG. 11 is a vertical sectional view showing the schematic configuration of a liquid crystal display (LCD) back light employing a secondary electron amplification structure according to an embodiment of the present invention. The embodiment of FIG. 11 has a similar structure to that of a surface discharge type triode PDP employing a secondary electron amplification structure. The embodiment includes a front glass substrate 60 and a rear glass substrate 50 which face each other with a discharge space 59 therebetween. Partition walls 56 are formed to seal the discharge space 59 tightly. A first electrode 57 for provoking initial discharge in the discharge space 59, i.e., for forming wall charge, is formed on the bottom surface of the front glass substrate 60. A luminescent material layer 58 is formed on the first electrode 57. Surface discharge for sustaining discharge is provoked using wall charge within the discharge space 59. A second electrode 51 and a third electrode 52 for performing the surface discharge are formed on the rear glass substrate 50 in parallel with a predetermined interval therebetween. A dielectric layer 53 is deposited on the rear glass substrate 50 such that the second and third electrodes 51 and 52 are covered with the dielectric layer 53. A secondary electron amplification structure is formed on the dielectric layer 53 by sequentially stacking a CNT 54 and a MgO protection layer 55 on the dielectric layer 53. As described above, the embodiment includes a secondary electron amplification structure composed of the CNT 54 and the MgO protection layer 55 so as to be improved in the secondary electron amplification effect. Instead of the MgO protection layer 55, a fluoride such as $MgF_2$, $CaF_2$ or LiF or an oxide such as $Al_2O_3$, ZnO, CaO, SrO, $SiO_2$ or $La_2O_3$ may be deposited on the CNT 54 to form a secondary electron amplification structure. In this case, a considerable secondary electron amplification effect can also be obtained. These materials are preferably formed on an electrode composed of a metal having a large electron emission coefficient, such as Cs, W, Mo, Ta, Fe or Cu.

Figure 12:
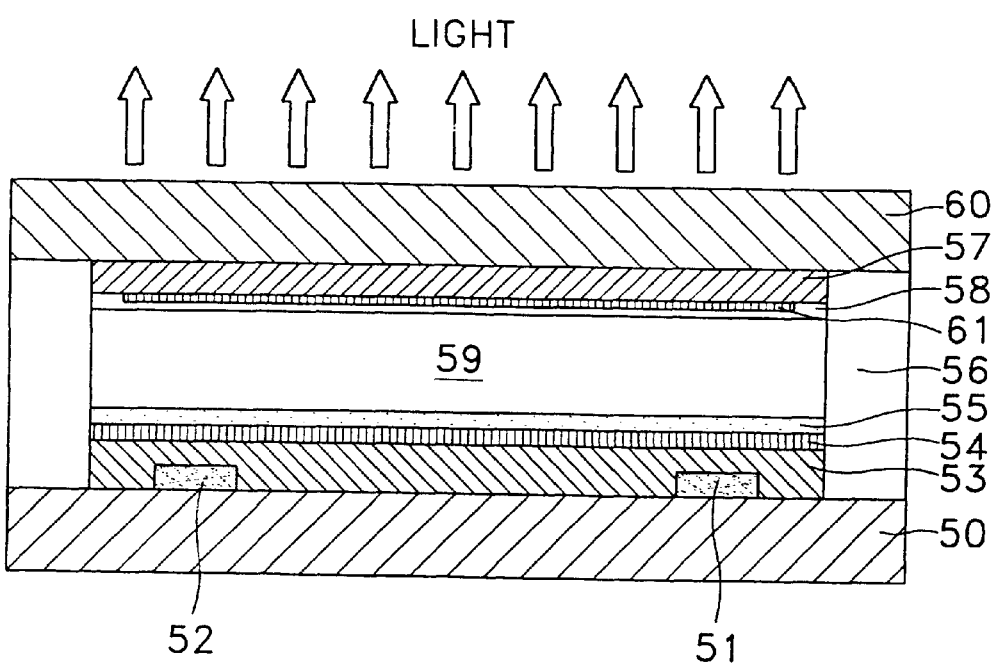
FIG. 12 is a vertical sectional view showing the schematic configuration of a LCD back light employing a secondary electron amplification structure according to another embodiment of the present invention.

Referring to FIG. 12, it is preferable to form a CNT 61 between a first electrode 57 and a luminescent material layer 58 in a back light as shown in FIG. 11. In this case, the luminance of the back light is further improved. The exact factor of the improvement of luminance is not known, but it is considered that the luminance improvement is due to an increase in the surface area of a luminescent material.

As described above, a secondary electron amplification structure according to the present invention is formed by stacking a MgO film, a film of a fluoride such as $MgF_2$, $CaF_2$ or LiF, or a film of an oxide such as $Al_2O_3$, ZnO, CaO, SrO, $SiO_2$ or $La_2O_3$ on a CNT, thereby functioning to increase the secondary electron emission coefficient caused by electrons or ions. The following effects can be obtained when using the secondary electron amplification structure.

When the secondary electron amplification structure is applied to a PDP, a secondary electron emission coefficient γ caused by ions is increased in the PDP, thereby achieving high luminance. This means that the driving voltage for the PDP can be decreased. In addition, the PDP circuit is stabilized and manufacturing cost is reduced. When the secondary electron amplification structure is applied to an LCD back light employing a PDP structure, the brightness of the LCD back light is increased. This also means that the driving voltage for the back light can be decreased.

When the secondary electron amplification structure is applied to a FED, an LCD back light employing a FED structure, a MCP and a PMT, similarly in a PDP, a secondary electron emission coefficient δ is increased. By inserting a CNT or a CNT=CNT+MgO into each cell of these devices, luminance can be increased and a driving voltage can be decreased. Since the present invention increases an amplification factor, the thickness, diameter or structure of an amplifier can be modified without limit when using the present invention. Accordingly, the present invention can also improve the performance of devices using MCPs. Consequently, the present invention improves the performance of devices (decrease in driving voltage and increase in luminance), reduces the costs and improves the yield.

The present invention has been described by way of exemplary embodiments to which it is not limited. Various modifications and variations of the present invention will occur to those skilled in the art without departing from the scope of the present invention.

What is claimed is:

1. A secondary electron amplification structure comprising
   a carbon nanotube layer; and
   a second layer formed of one material selected from the group consisting of MgO, $MgF_2$, $CaF_2$, LiF, $Al_2O_3$, ZnO, CaO, SrO, $SiO_2$ and $La_2O_3$ stacked on the carbon nanotube layer.

2. The secondary electron amplification structure of claim 1, wherein said layer is a MgO layer.

3. The secondary electron amplification structure of claim 1, wherein the carbon nanotube layer is deposited on an electrode formed of at least one metal selected from the group consisting of Cs, W, Mo, Ta, Fe and Cu.

4. A plasma display panel comprising:
   front and rear substrates disposed to face each other with a predetermined gap therebetween;
   electrodes formed between the facing front and rear substrates, the electrodes crossing one another; partition walls formed between electrodes on the rear substrate, the partition walls maintaining the predetermined gap between the front and rear substrates, the partition walls forming discharge cells;
   luminance materials deposited on the sides of the partition walls and on the electrodes on the rear substrate; and
   a secondary electron amplification structure, said secondary electron amplification structure comprising:
      a carbon nanotube layer formed on the electrodes on the front substrate; and
      a second layer formed of one material selected from the group consisting of MgO, $MgF_2$, $CaF_2$, LiF, $Al_2O_3$, ZnO, CaO, SrO, $SiO_2$ and $La_2O_3$ stacked on the carbon nanotube layer.

5. The plasma display panel of claim 4, wherein said second layer is a MgO layer.

6. The plasma display panel of claim 4, wherein the electrodes are formed of at least one metal selected from the group consisting of Cs, W, Mo, Ta, Fe and Cu.

7. The plasma display panel of claim 4, further comprising a carbon nanotube layer between said luminescent material and at least one electrode on the rear substrate of each discharge cell.

8. The plasma display panel of claim 5, further comprising a carbon nanotube layer on each partition wall between said luminescent material and the MgO layer of each discharge cell.

9. A surface discharge type triode plasma display panel comprising:
   front and rear substrates disposed to face each other with a predetermined gap therebetween;
   address electrodes formed on the rear substrate in a striped pattern;
   partition walls formed between the address electrodes on the rear substrate parallel to the address electrodes, the partition walls maintaining the predetermined gap between the front and rear substrates, the partition walls forming discharge cells;
   luminance material deposited on the sides of the partition walls and on the address electrodes;
   scanning electrodes and common electrodes formed parallel to each other in a striped pattern on the front substrate with a predetermined gap therebetween, the scanning and common electrodes crossing the address electrodes;
   a dielectric layer deposited on the front substrate such that the scanning and common electrodes are covered with the dielectric layer; and
   a secondary electron amplification structure, said secondary electron amplification structure comprising:
      a carbon nanotube layer formed on the dielectric layer; and
      a second layer formed of one material selected from the group consisting of MgO, $MgF_2$, $CaF_2$, LiF, $Al_2O_3$, ZnO, CaO, SrO, $SiO_2$ and $La_2O_3$ stacked on the carbon nanotube layer.

10. The surface discharge type triode plasma display panel of claim 9, wherein said second layer is a MgO layer.

11. The surface discharge type triode plasma display panel of claim 9, wherein the electrodes are formed of at least one metal selected from the group consisting of Cs, W, Mo, Ta, Fe and Cu.

12. The surface discharge type triode plasma display panel of claim 9, further comprising a carbon nanotube layer between said luminescent material and at least one electrode on the rear substrate of each discharge cell.

13. The surface discharge type triode plasma display panel of claim 10, further comprising a carbon nanotube layer on each partition wall between said luminescent material and the MgO layer of each discharge cell.

14. A back light comprising:
   front and rear substrates disposed to face each other with a predetermined gap therebetween to form a discharge space;
   a first electrode formed on the surface of the front substrate in the discharge space;
   a luminescent material layer formed on the first electrode;
   a second electrode and a third electrode formed parallel to each other on the rear substrate in the discharge space with a predetermined gap therebetween, the second and third electrodes sustaining discharge;
   a dielectric layer deposited on the rear substrate such that the second and third electrodes are covered with the dielectric layer;
   partition walls for maintaining the predetermined gap between the front and rear substrates to be sustained and sealing the discharge space; and
   a secondary electron amplification structure, said secondary electron amplification structure comprising:
      a carbon nanotube layer formed on the dielectric layer; and
      a second layer formed of one material selected from the group consisting of MgO, $MgF_2$, $CaF_2$, LiF, $Al_2O_3$, ZnO, CaO, SrO, $SiO_2$ and $La_2O_3$ stacked on the carbon nanotube layer.

15. The back light of claim 14, wherein said second layer is a MgO layer.

16. The back light of claim 14, wherein the second and third electrodes are separately formed of at least one metal selected from the group consisting of Cs, W, Mo, Ta, Fe and Cu.

17. The back light of claim 14, further comprising a carbon nanotube between the luminescent material layer and the first electrode.

18. The secondary electron amplification structure of claim 2, wherein the carbon nanotube layer is deposited on an electrode formed of at least one metal selected from the group consisting of Cs, W, Mo, Ta, Fe and Cu.

19. The plasma display panel of claim 5, wherein the electrodes are formed of at least one metal selected from the group consisting of Cs, W, Mo, Ta, Fe and Cu.

20. The plasma display panel of claim 5, further comprising a carbon nanotube layer between said luminescent material and at least one electrode on the rear substrate of each discharge cell.

21. The surface discharge type triode plasma display panel of claim 10, wherein the electrodes are formed of at least one metal selected from the group consisting of Cs, W, Mo, Ta, Fe and Cu.

22. The back light of claim 15, wherein the second and third electrodes are separately formed of at least one metal selected from the group consisting of Cs, W, Mo, Ta, Fe and Cu.

23. The back light of claim 15, further comprising a carbon nanotube between the luminescent material layer and the first electrode.

* * * * *